United States Patent
Cheng et al.

(10) Patent No.: US 10,696,832 B2
(45) Date of Patent: Jun. 30, 2020

(54) POLYPROPYLENE FILM HAVING UNIQUE AESTHETICS

(71) Applicant: The Procter & Gamble Company, Cincinnati, OH (US)

(72) Inventors: Zhan Cheng, Beijing (CN); Zhe Guan, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 165 days.

(21) Appl. No.: 15/877,471

(22) Filed: Jan. 23, 2018

(65) Prior Publication Data

US 2018/0208752 A1    Jul. 26, 2018

(30) Foreign Application Priority Data

Jan. 25, 2017    (WO) ................ PCT/CN2017/072548

(51) Int. Cl.
*C08L 23/12* (2006.01)
*C08L 33/12* (2006.01)
*C08J 5/18* (2006.01)
*C08L 23/14* (2006.01)

(52) U.S. Cl.
CPC ............... *C08L 23/12* (2013.01); *C08J 5/18* (2013.01); *C08L 23/14* (2013.01); *C08L 33/12* (2013.01); *C08F 2500/15* (2013.01); *C08F 2500/17* (2013.01); *C08J 2323/14* (2013.01); *C08J 2433/12* (2013.01); *C08L 2205/025* (2013.01); *C08L 2205/08* (2013.01); *C08L 2207/10* (2013.01)

(58) Field of Classification Search
CPC ............. C08L 33/12; C08L 23/10–142; C09D 133/12; C09D 123/10–142; C09J 133/12; C09J 123/10–142; C08J 2433/12; C08J 2323/10–14
See application file for complete search history.

(56) References Cited

U.S. PATENT DOCUMENTS

| | | | |
|---|---|---|---|
| 5,122,906 A | 6/1992 | Wheatley | |
| 2005/0038192 A1 | 2/2005 | Janssens | |
| 2006/0122332 A1* | 6/2006 | Yang et al. ............. | C08L 33/06 525/191 |
| 2008/0213522 A1 | 9/2008 | Singh | |
| 2011/0091690 A1 | 4/2011 | Lin et al. | |
| 2015/0314939 A1 | 11/2015 | Hde | |
| 2017/0107339 A1 | 4/2017 | Cheng et al. | |

FOREIGN PATENT DOCUMENTS

| | | |
|---|---|---|
| CN | CN103435911 A | 12/2013 |
| FR | 2873618 A1 | 2/2006 |
| JP | 08099395 A | 4/1996 |
| JP | H08142277 A | 6/1996 |
| JP | 2006243421 A | 9/2006 |
| JP | 4080284 B2 | 4/2008 |

OTHER PUBLICATIONS

INEOS Olefins and Polymers, Eltex P KS 407 Data Sheet (2013).*
Altuglas International, Typical Physical Properties of Plexiglas DR-101 (2005).*
Ineos Olefins and Polymers, Typical Engineering Properties of Polypropylene (2014).*
International Search Report, PCT/CN2017/072548, 4 pgs.
Supplementary Search Report dated Mar. 29, 2019, PCT/CN2017/072548, 10 pgs.
U.S. Appl. No. 15/641,005, filed Apr. 3, 2017, Pan et al.

* cited by examiner

*Primary Examiner* — Kregg T Brooks
(74) *Attorney, Agent, or Firm* — Sarah M DeCristofaro

(57) ABSTRACT

Certain films comprising polypropylene and poly(methyl 2-methylpropenoate) have unique aesthetic effects.

14 Claims, No Drawings

POLYPROPYLENE FILM HAVING UNIQUE AESTHETICS

FIELD OF THE INVENTION

The present application is directed to the polypropylene films, and methods of making the same.

BACKGROUND OF THE INVENTION

Flexible thermoplastic films are used in a variety of applications including the construction of packaging and containers, protective films and coatings, and even wall paper. Typical thermoplastic polymers types include polyethylene (PE), polyethylene terephthalate (PET), and polypropylene (PP). In turn, PP can be found in different grades such as homopolymer, random copolymer, and impact copolymer. Films can be blown or cast, and subsequently are typically stretched. Stretching can be in the machine direction, across the machine direction (i.e., traverse direction), or biaxially stretched Films may have one or more layers (of the same or different polymer types).

There is generally a need to provide visual aesthetics to PP films so products or packaging is more attractive to consumers or connotes higher quality. Examples of desirable aesthetic effects include pearlescent, metallic-like visual effects, increased opacity, and combinations thereof. Conventional approaches to providing these aesthetic effects to films include the use of metallic or pearlescent agents, or metallic or pearlescent inks. However, these ingredients are generally expensive and thus are cost prohibitive in many applications.

One way to characterize these pearlescent and/or metallic-like aesthetic effects from films is by way of a Flop Index. Briefly, Flop Index is the measurement on the change in reflectance of a color as it is rotated through the range of viewing angles. A Flop Index of 0 indicates a solid color, while a very high metallic or pearlescent color may have a Flop Index of 15. There is a need to provide PP films that have desirable aesthetic effects without, or at least minimizing, the use of expensive pearlescent/metallic agents or pearlescent/metallic inks, while preferably being cost effective.

One example of desirable aesthetic effects is opacity. In some applications, film opacity connotes quality. One conventional way of providing opacity to films is the use of opacifiers such as titanium dioxide. However, there are potential drawbacks to using titanium dioxide. The ingredient is generally expensive for many applications. Moreover, it has been reported that higher levels of titanium dioxide in some films may reduce sealing performance in subsequent forming or packing processes. Furthermore, high titanium dioxide loading levels tend to have titanium dioxide distribution problem in some films, in which the titanium dioxide particles form a gel in the film and cause a so called "fish eye" defect in the film. Yet further, this defect may bring in further defects in printing thereby harming the overall aesthetics of printed film. One way to characterize opacity is by ISO method 6504. There is a need to provide PP films that have improved opacity without, or at least minimizing, the use of opacifiers (such as titanium dioxide), while preferably exhibiting desired film aesthetic effects (and doing so cost effectively).

Applicant has discovered a PP film exhibiting desirable aesthetics effects by blending a PP and a relatively high level of silicone in a film formulation, where the silicone and PP in the subject film layer are stretched at a relatively low stretching temperature (e.g. far below 70° C.). However, low stretching temperature may pose difficulties in certain large-scale manufacturing process (e.g. slow speed, limited stretch ratios, or film failures during process).

Therefore, there is a need to provide a PP film that exhibits desirable aesthetics effects, while preferably eliminates, or at least minimizes, the use of expensive and/or performance inhibiting ingredients, and can also be processed at moderate or even higher temperature processing conditions that is typically characteristic of large scale production.

SUMMARY OF THE INVENTION

The present invention meets one or more of these needs based on the surprising discovery that by blending a poly (methyl 2-methylpropenoate) thermoplastic polymer (also known as poly methyl methacrylate or simply "PMMA"), and polypropylene ("PP") in a film formulation, preferably where the PP and/or PMMA polymer have a certain respective Vicat softening point range, more preferably where the PMMA and PP each have complex viscosity and are at certain complex viscosity ratio range, more preferably the film comprising the subject PMMA and PP is oriented at a desirable orientating temperature (e.g. 70° C. or above), provides a film exhibiting unique aesthetics and/or performance benefits. In one non-limiting example, these aesthetics may be measured by Opacity, Flop Index (FI), or combinations thereof.

It is an advantage of the film to provide desirable aesthetic effects while minimizing, preferably omitting, the use of pearlescent/metallic agents and/or pearlescent/metallic inks. Preferably these unique aesthetic effects are silk-like visual effects (i.e., mimicking the visual appearance of real silk).

It is an advantage of the film to also provide unique tactile benefits (e.g., softness or smoothness).

It is an advantage of the film to be made on large scale operation with modifications within the tolerance of most commercial machines.

It is an advantage of the film to have greater opacity than comparable conventional films.

It is an advantage of the film to minimize the use of material and/or thickness while providing relatively high levels of opacity.

It is an advantage of the film to having relatively high levels of opacity while minimizing the amount of opacifiers (such as titanium dioxide).

It is an advantage of the film to have increased mechanical properties compared to conventional cast or blown films of the same thickness.

It is an advantage of the film that is printable and maximizing quality of the artwork that is printed on the film.

One aspect of the invention provides for a film comprising at least one layer, wherein the at least one layer comprises: a) 60% to 99%, by weight of the at least one layer, of polypropylene (PP)-based component; b) 1% to 40%, by weight of the at least one layer, of poly(methyl 2-methylpropenoate) (PMMA)-based component; and c) 0% to 30%, by weight of the at least one layer, of an optional additive. Preferably, the PP-based component comprises at least a first polypropylene polymer, wherein the first polypropylene polymer has a Vicat softening point of 100° C. and above under 1 kg and rate A according to ASTM D1525. Preferably, the PP-based component comprises from 10% to 100%, preferably from 20% to 99.5%, more preferably from 50 to 99%, by weight of the PP-based component, of the first polypropylene polymer. Preferably, the PP-based component further comprises a second polypropylene polymer, wherein the second polypropylene polymer has a Vicat softening point above 150° C., preferably from above 150° C. to 160° C. Preferably, the PMMA-based component and the PP-based component have a complex viscosity ratio PMMA/PP of 20 or below, preferably from 0.15 to 15, more preferably from 1.7 to 8, wherein the complex viscosity is measured via a rotational rheometer with oscillation frequency sweep from 100 to 0.1 rad/s within 20 mins, under condition of isothermal oscillation at a 220° C. temperature with 1% constant strain according to ASTM D4440-15. Preferably, the PMMA-based component and the PP-based component have a melt index ratio PMMA/PP of 0.1 or above, preferably from 0.6 to 10, and more preferably from 1 to 5, and wherein the melt index is measured at 190° C. and 2.16 Kg for PP and at 230° C. and 3.8 Kg for PMMA according to ASTM D1238. Preferably the film, wherein the at least one layer is characterized by at least one of the following, preferably at least two of the following: Flop Index (FI) is at least 1 according to ASTM E2539; opacity is greater than 50%, preferably greater than 60%, more preferably greater than 80%; when measured at 70 microns thickness per ISO 6504. Preferably the film is substantially free of pearlescent/metallic agents and pearlescent/metallic inks.

Another aspect of the invention provides for a method of making a film of the present invention, comprising the step of uniaxially orientating at an orientating temperatures of 70° C. or above (alternatively from 71° C. to 129° C.), preferably 90° C. to 120° C., more preferably from 95° C. to 110° C.

These and other features, aspects and advantages of specific embodiments will become evident to those skilled in the art from a reading of the present disclosure.

DETAILED DESCRIPTION OF THE INVENTION

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

The present invention is generally directed to a PMMA and PP blended film and stretching the film at moderate temperature (vs. low temperatures) or under conditions that are generally conducive to large scale production. Without wishing to be bound by theory, PP and PMMA are generally polymers that are immiscible in each other and consequently the blended films herein have a first phase of PMMA particles dispersed in a second phase of a PP matrix. By stretching, phase separation happens around these PMMA particles to form a cavitation. In turn, this cavitation creates an interface which interacts with incident light. This interaction with light contributes to the unique aesthetic effects. The difference in the refractive index between PMMA and PP further enhances the interaction and therefore the aesthetic effect.

It is also surprisingly discovered that the Vicat softening point of PP-based component and the PMMA-based component is an important factor for the unique aesthetic effects of the film. The Vicat softening point, also known as Vicat hardness, is the determination of softening point for materials that have no definite melting point. It is desired for the PP-based component and the PMMA-based component comprised in the film each have a specific Vicat softening point range. Preferably, the PP-based component comprises at least a first polypropylene polymer having a Vicat softening point of no less than 100° C., under 1 kg and rate A according to ASTM D1525. Preferably, the PP-based component comprises at least a first polypropylene polymer having a Vicat softening point from 100° C. to 150° C., preferably from 105° C. to 140° C., and more preferably from 110° C. to 125° C.; and more preferably a second polypropylene polymer having a Vicat softening point above 150° C., preferably from 151° C. to 160° C. Preferably, the PMMA-based component comprises a PMMA polymer having a Vicat softening point no less than 95° C., preferably from 98° C. to 115° C., more preferably from 102° C. to 113° C., under 1 kg and rate A according to ASTM D1525. Without wishing to be bound by theory, having a Vicat softening point in these desired ranges helps for film processing conditions (e.g., allowing for relative moderate or high film orientating temperatures). If the Vicat softening point of the PP and/or PMMA polymer is too high, the film can be prone to process failures at the desired processing conditions. On the other hand, if the Vicat softening point is too low, the PP and/or PMMA polymers become too soft at the desired processing conditions, which can result in difficulties for forming desired cavitation and thus the desired aesthetic effects.

These unique aesthetic visual effects may be assessed by one or more of the following analytical techniques: Flop Index (FI) according to ASTM E2539; and opacity at a defined thickness per ISO 6504.

The term "film" is used broadly to include those films having at least one, or two, or more layers. For example, a two layer co-extrusion film may have a first layer according to the invention described herein while the second layer is a conventional one. The film of the present invention may be blown or casted, preferably are uniaxially oriented, and more preferably uniaxially oriented in the machine direction. Alternatively, the film of the present invention may be uniaxially oriented in the cross-machine direction. Alternatively, the film of the present invention may be biaxially oriented in both machine direction and cross-machine direction. Preferably, the film is a flexible film. In multi-layer films of the present invention, other layers of the film may contain PE, PP, PET, PVOH, tie polymers or combinations thereof. Yet other layers of the multi-layer film may contain PP without PMMA.

Polypropylene ("PP")

At least one layer of the films of the present invention comprises polypropylene (PP) as a principle thermoplastic polymer (i.e., a PP-based film). In other words, at least one layer of the film comprises a PP-based component. In turn, the PP-based component may comprise one or more types of PP polymers.

An important aspect of the present invention is the Vicat softening point of the PP polymer(s). The PP-based component comprises 10% to 100%, by weight of the PP-based component, of a first PP polymer having a Vicat softening point of no less than 100° C., preferably from 100° C. to 150° C., more preferably from 105° C. to 140° C. and even more preferably from 110° C. to 125° C., under 1 kg and rate A according to ASTM D1525. Preferably, the first PP polymer is present in an amount of from 20% to 99.5%, alternatively from 25% to 99%, more preferably from 50% to 99%, alternatively from 50% to 60%, or 60% to 70%, or 70% to 80%, or 80% to 90%, or 90% to 99%, by weight of the PP-based component.

The first PP polymer can advantageously be a random PP-based copolymer or a block PP-based copolymer (for purpose of this allocation "copolymer" includes terpolymers). Preferably, the first PP polymer is selected from the group consisting of a random propylene-olefin copolymer, a block propylene-olefin copolymer, and combinations thereof. More preferably, the first PP polymer is selected from the group consisting of a random propylene-α-olefin copolymer, a block propylene-α-olefin copolymer, and combinations thereof; and more preferably wherein the α-olefin is selected from the group consisting of ethylene, 1-butene, 1-hexene, and combinations thereof. Suitable suppliers/products for PP may include Sinopec Chemicals, LBI, and Borealis.

The PP-based component may further comprise a second polypropylene polymer, wherein the second polypropylene polymer has a Vicat softening point above 150° C., preferably from above 150° C. to 160° C. Preferably, the second polypropylene polymer may be present in an amount of from 1% to 90%, preferably from 5% to 80%, more preferably from 10% to 50%, alternatively from 8% to 60%, or 12% to 45%, or 15% to 30%, or 15% to 20%, by weight of the PP-based component.

The second polypropylene polymer in the PP-based component may be selected from the group consisting of a polypropylene homopolymer, a random propylene-olefin copolymer, a block propylene-olefin copolymer, and combinations thereof. Preferably, the second polypropylene polymer may be selected from the group consisting of a polypropylene homopolymer, a random propylene-α-olefin copolymer, a block propylene-α-olefin copolymer, and combinations thereof; and more preferably wherein the α-olefin is selected from the group consisting of ethylene, 1-butene 1-hexene, and combinations thereof. Generally, polypropylene homopolymer has a relatively higher Vicat softening point than random or block copolymer. For example, polypropylene homopolymer has a Vicat softening point above 150° C. Preferably, the second polypropylene polymer is polypropylene homopolymer. More preferably, the PP-based component comprises 10% to 90%, preferably 10% to 50%, alternatively from 12% to 45%, or 15% to 30%, or 15% to 20%, by weight of the PP-based component, of polypropylene homopolymer. Preferably the polypropylene homopolymer comprises an Isotactic Index at or greater than 93%, more preferably at or greater than 94%, yet more preferably at or greater than 95%, alternatively at or less than 98%.

PMMA

Films of the present invention typically comprise 1% to 40%, by weight of the at least one layer of the film, of a PMMA-based component. In turn, the PMMA-based component may comprise one or more divisions (or even subdivisions) of a PMMA polymer. The PMMA component is blended with the PP component (within at least one layer of the film) before the extrusion or casting stage of the film making process. Preferably the at least one layer of the film comprises from 1% to 35%, preferably 2% to 30%, more preferably 3% to 25%, yet more preferably 4% to 20%, yet still more preferably 5% to 15%, by weight of the at least one layer, of the PMMA-based component. The PMMA-based component comprises at least one PMMA polymer, optionally two or more PMMA polymers.

Preferably the Vicat softening point for at least one PMMA polymer (of the PMMA-based component) is from 95° C. to 120° C., preferably from 98° C. to 115° C., more preferably is between 102° C. and 113° C.; under 1 kg and rate A according to ASTM D1525.

Preferably the at least one PMMA polymer (of the PMMA-based component) used in the present invention has a refractive index that equals or is less than 1.49 according to ASTM D-542. Without wishing to be bound by theory, the refractive index difference between PP and PMMA determines the intensiveness of the light interaction in the interface, wherein having a greater difference is preferred.

Different brands and manufactures of PMMA polymers may include: Lucite®L (Lucite International, Inc, USA); Plexiglas® (Altuglas International); and Acrylite® GP (Piedmont Plastics, CYRO Industries, USA). Arkema may also be a suitable supplier of PMMA. The PMMA polymer can also be one that is modified, such as, for example, the polyvinylidene fluoride polymers as described in WO 2009108469.

The melt index of PMMA and PP can be measured and the melt index ratio between PMMA and PP is described. The melt index is measured at 190° C. and 2.16 Kg for PP and at 230° C. and 3.8 Kg for PMMA according to ASTM D1238. The melt index ratio between the at least one PMMA polymer (of the PMMA-based component) and the first PP polymer (of the PP-based component) is 0.1 or above, preferably from 0.6 to 10, more preferably from 1 to 5. Alternatively, the melt index ratio between the PMMA-based component (as a whole) and the PP-based component (as a whole) is 0.1 or above, preferably from 0.6 to 10, more preferably from 1 to 5.

The complex viscosity of PMMA and PP can also be measured according to ASTM D4440. Complex viscosity is measured at a temperature range from 150° C. to 240° C., depending on actual process ability and polymer property. The complex viscosity is measured on a rotational rheometer with oscillation frequency sweep from 100 to 0.1 rad/s within 20 mins, under condition of isothermal oscillation at a certain temperature with 1% constant strain. The preferred temperature range for isothermal frequency sweep is 200° C. to 240° C., which coincides with the desired processing conditions. The unit for the complex viscosity is Pa*s. Under 220° C. and at 100 rad/s frequency, the complex viscosity of at least one PMMA polymer (of the PMMA-based component) is from 100 Pa*s to 2500 Pa*s, preferably 150 Pa*s to 2000 Pa*s. The rotational rheometer used for this test is HAAKE MARS II from Thermo Scientific (Thermo Fisher Scientific Inc., MA, USA). Measuring at higher frequency is preferred because it may better reflect film extrusion conditions.

The complex viscosity ratio between PMMA and PP can be described. The complex viscosity ratio between at least one PMMA polymer (of the PMMA-based component) and at least first PP polymer (of the PP-based component) is 20 or below, preferably from 0.15 to 15, more preferably from 1.7 to 8, where the complex viscosity of both PMMA and PP is measured at the same condition as previously described. Alternatively, the complex viscosity ratio between the PMMA-based component (as a whole) and the PP-based component (as a whole) is 20 or below, preferably from 0.15 to 15, more preferably from 1.7 to 8, where the complex viscosity is measured at the same condition as previously described. Example of PP and PMMA pair fall into this ratio range is PP Clyrell® RC1890™ and PMMA Acryrex® CM211™ with ratio being between 0.197-0.802 with frequency between 0.1 rad/s to 100 rad/s under 220° C.

The films may contain optional additive(s). The at least one layer of the film comprises from 0% to less than 30%, preferably from 1% to 25%, more preferably from 2% to 20%, yet more preferably from 3% to 15%, by weight of the at least one layer, of an optional additive. The optional additive preferably is selected from the group consisting of a silicone additive, a compatibilizer, and combinations thereof.

Silicone Additive

A silicone additive is an optional additive in the films herein. Without wishing to be bound by theory, silicone additive can act not only as a slip agent, but certain silicone additives or at relatively higher levels can enhance the visual and/or tactile effects of the films herein. The films of the present invention, that contain silicone additive, may comprise from 0.01% to 10% of the silicone additive by weight of the at least one layer of the film, preferably from 0.5% to 8%, more preferably from 1% to 5%, yet more preferably from 1.5% to 3% by weight of the at least one layer of the film, of the silicone additive. Preferably the silicone additive has a kinematic viscosity of at least 500 centistokes (cSt), preferably from 1,000 cSt to 40,000,000 cSt. More preferably the silicone additive is an ultra high molecular weight silicone having a molecular weight from 400,000 Dalton to 700,000 Daltons, preferably from 500,000 Daltons to 650,000 Daltons. The silicone additive can be added either via a master batch which to be blended with other ingredients during film extrusion stage; or at a film extrusion stage in which the silicone additive is directly blended with other ingredients; or a combination thereof.

Many silicone types are contemplated within the scope of the invention. The silicone additive is preferably a silicone fluid, more preferably is selected from the group consisting of polydimethylsiloxane homopolymers, copolymers consisting essentially of dimethylsiloxane units and methylphenylsiloxane units, copolymers consisting essentially of diphenylsiloxane units and methylphenylsiloxane units, and combinations thereof.

Compatibilizer

A compatibilizer is an optional, but preferred optional ingredient in the at least one layer of the film. PP and PMMA blends are generally immiscible in each other due to the nonpolar nature of polypropylene and polar nature of PMMA. This immiscibility may lead to phase separation, which is a factor for the poor mechanical properties of many films made from these blends, but also contributes to the visual effects achieved via orientation process per present invention (further described herein). Some of the negative effects of the immiscibility of the PMMA and PP blends of the present invention can be mitigated by adding a proper compatibilizer (and at a proper level).

Generally, and without wishing to be bound by theory, the function of a compatibilizer used in the present invention is to reduce interface tension (i.e., strengthen the interface between the first and second phases of the film) and thus improve mechanical properties of the stabilized blend (e.g., reducing the size and morphology of the separated phases). It is thought the compatibilizer strengthens the interface by broadening it from a sharp change in composition and properties to a broader gradual transitional interface.

In present invention, there is a balance to be reached with the use of a compatibilizer in the PMMA and PP blended films. On one hand, adding compatibilizer makes for finer PMMA phase which can help achieve more desirable structures (in providing the visual effects). And the compatibilizer can also strengthen the interface and thus help improve film mechanical film strength. However, on the other hand, compatibilizer may make phase separation more difficult during stretching, thereby inhibiting the formation of the desired microstructure. Of course some films of the present invention are free or substantially free of these compatibilizers.

An example of a suitable compatibilizer material includes maleic anhydride grafted LLDPE (LLDPE-g-MA). One suitable supplier of such LLDPE-g-MA includes Mitsui Chemical. Other suitable compatibilizer materials include but not limited to ethylene vinyl acetate, ethylene acrylic acid, ethylene butyl acrylate, and PMMA grafted PE (PE-g-PMMA), etc.

The at least one layer of the film typically comprises 0.1% to 7%, preferably 0.5% to 5%, more preferably 1% to 3%, alternatively 1.5% to 2%, by weight of the at least one layer, of the compatibilizer.

Opacifier

It is an advantage of some of the inventive films herein to have more opacity than comparable conventional films while minimizing the amount of opacifier (such as titanium dioxide). Generally, opacity is a measure of the capacity of a material to obscure the background behind it. Opacity measurements are sensitive to material thickness and degree of pigmentation or level of opacifier (e.g. titanium dioxide ($TiO_2$) particles). The opacity value is shown as a percentage between 1 and 100%. The value for opacity is obtained by dividing the reflectance obtained with a black backing (RB) for the material, by the reflectance obtained for the same material with a white background (WB). This is called the contrast ratio (CR) method % Opacity=RB/RW×100. Suitable methods to measure opacity include ISO 6504.

Other opacifiers may include $CaCO_3$, Carbon black, $ZnO_2$, $BaSO_4$, and organic dye. In some applications, titanium dioxide is preferred where the films are desired to have a white appearance. One skilled in the art will readily identify other opacifiers by selecting those materials that have a refractive index substantially different than the rest of the film layer. Many of films described herein provide greater opacity (potentially as well as other desired aesthetic visual effects) that cannot otherwise be provided by many conventional films (of comparable or lower thickness etc.). In those applications, where increased opacity is desirable, the present films may provide enough opacity without expensive opacifiers or at least minimizing the use of such opacifiers (such as titanium dioxide ($TiO_2$)). Even those films where significant opacity is needed, a lesser amount of opacifier may be used (thereby providing cost and/or other improvements).

In some applications, the film of the present invention may have opacity of greater than 40%, preferably greater than 50%, more preferably greater than 60%, at a film thickness at or below 50 microns per ISO 6504. Preferably the film contains from 0% to less than 5%, preferably from 0.001% to 4%, more preferably from 0.01% to 3%, by weight of the at least one layer of the film, of an opacifier; preferably wherein the opacifier is titanium dioxide.

Master Batch

A master batch comprising PP and PMMA; and optionally silicone additive and/or compatibilizer, is prepared. Typically the master batch comprises from 50% to 95%, preferably 60% to 90%, alternatively about 60%, by weight of the master batch, of a PP-based component. The master batch typically comprises from 5% to 50%, preferably from 8% to 40%, alternatively from 10% to 30%, alternatively about 20%, by weight of the master batch, of a PMMA-based component. The master batch typically comprises from 5% to 20%, preferably from 10% to 20%, alternatively from 12% to 18%, alternatively about 15%, by weight of the master batch, of a silicone additive. Of course the master batch may comprise additional optional ingredients, preferably from 0% to 10% by weight of the master batch. Non-limiting examples of additional optional ingredients that may be included in the master batch may include slip agents and anti-block agents and ultraviolet light protective agents.

The master batch may be prepared by heat extruding a first batch of PP pellets with a first heated extruder, either single or double screw, wherein the PMMA and optional silicone additive/compatibilizer are added at one more ports along the extruder. Typical operating temperatures for the first heated extruder are from 180° C. to 250° C., preferably 190° C. to 230° C. Preferably the maximum heat of the first heated extruder is at the lower range than that recommended as the processing temperature for PMMA pellets, as PMMA typically has a higher process temperature than polypropylene pellets. For purposes of clarification, the term "pellets" means smaller sized nuggets, pastilles, or the like to allow for efficient melting and/or extrusion and/or blending.

Extrusion

The master batch may be combined with a second batch of PP pellets in a desired weight ratio. The second batch of PP pellets may or may not be the same composition as the first batch of PP pellets (as detailed above in master batch preparation). A typical weight ratio range between the master batch and the second batch of PP pellets is from 1:1 to 1:9 weight ratio, preferably from 1:2 to 1:4 weight ratio, more preferably from 1:2 to 1:3 weight ratio, respectively. The combination of master batch and second batch of PP pellets may be subjected to a blending step to provide a blend.

The resulting blend is extruded through a second heated extruder, either single or double screw, preferably through an extruder having a temperature gradient to form an extrudate. Initial temperatures of the second heated extruder, for example, may be at 200° C. incrementally increased downstream to a final temperature of 250° C. Of course these temperatures may vary depending upon the composition of the resulting blend, and length/speed of the second heated extruder etc. An optional step is adding yet more PMMA and/or silicone additive and/or compatibilizer through one or more ports of the second heated extruder to yet further increase the overall PMMA/silicone additive/compatibilizer concentration. Alternatively, no master batch is prepared, but rather PMMA or silicone additive or compatibilizer is simply added via the second heated extruder with only a single batch of PP pellets extruded there through.

The extrudate is formed after being extruded through the second heated extruder. The extrudate is then subjected to a blowing step or a casting step. The typical blowing step is to extrude the extrudate upward via a ring die to form a tube, and inflate the tube while pulling it through a collapsing frame whereby the tube is enclosed with a frame and nip rollers. The blowing step can also be a water quenching process, in which the inflated tube is extruded downward through a ring die with another water ring to spray water on the tube surface to quench it. A casting step subjects the extrudate though a T-die to form a flat sheet with an air knife to push the flat sheet against a cooling roller to set the film. These steps are generally conventional. The blown and/or casted extrudate is formed into an unconverted film. The unconverted film typically has hazy appearance and it requires additional orientation process to impart the desired unique aesthetic effects.

Machine Direction Orientation

The unconverted film is thereafter at least uniaxially oriented, preferably machine direction ("MD") oriented. The MD direction is also known as the longitudinal direction (generally perpendicular to the traverse direction (TD)). MD orientating is a preferred initial step after the unconverted film is formed. During the MD orientation, the unconverted film from the blown or casted line is heated to an orientation temperature via one or multiple hot rollers. The heated film is fed into a slow draw roll with a nip roller, which has the same rolling speed as the heating rollers. The film then enters a fast draw roll. The fast draw roll has a speed that is 2 to 10 times faster than the slow draw roll, which effectively stretches the film on a continuous basis. There can be another fast draw roll which is even faster than the first fast draw roll so that the film is subjected to two step stretching. Between the two stretching steps there is another set of heating rolls which sets the temperature of the film after the first stretching and before the second stretching. The temperatures in these two stretching steps can be the same or different. The orientation can also be a single stretching instead of two step stretching.

The total MD stretch ratio is from 2:1 to 20:1, more preferably from 3:1 to 10:1, and even more preferably from 5:1 to 8:1. The total MD stretch ratio includes all orientation steps. For example, if a two-step orientation is used with first stretch ratio 2:1 and second stretch ratio 3:1, the total stretch ratio is therefore 6:1.

An important aspect of the process of making the film of the present invention is the orientation temperature. At typical conventional temperature range, the PP amorphous phase polymer is well melted so that it has good mobility to accommodate the deformation during the stretching, while the crystallinity phase is still maintained and can be oriented during the stretching to impart desired film property. The orientation temperature of the present invention, preferably in a MD orientation, is of 70° C. or above, alternatively from 75° C. to 125° C., preferably from 85° C. to 120° C., more preferably from 95° C. to 110° C., for example at 100° C. The temperature also depends on the process speed. In general, higher process speed requires relatively higher temperature due to the relative shorter contacting time between film and hot rollers; while slower process speed requires relatively lower temperature due to the longer contacting time. During orientation, and without wishing to be bound by theory, the stretching results in phase separation in the interface between PMMA dispersed particles and the PP matrix, thereby forming micro cavities around PMMA particles. These cavities are typically stretched along the MD orientation direction and have a propagating effect along the machine direction and across the thickness of the film to create yet more larger quantity/more separation of the PMMA/PP interface. At relatively high orientation temperature, the mobility of the PP amorphous phase can be rather high and thus is able to fill these cavities preventing or eliminating the formation of some of these desired micro structures thereby undesirably affecting the aesthetics effects. However, relatively low stretching temperatures (e.g. below 70° C.) slows down the process speed and makes the film more difficult to be stretched due to higher stretching force, and the film may tend to break or rupture as the poor mobility of PP amorphous phase can't accommodate the desired deformation during orientation.

Optionally, the stretched film then enters annealing thermal rollers, which allow stress relaxation by holding the film at an elevated temperature for a period of time. Annealing generally makes the film less stiff and softer to the touch, which are desired tactile effects for a film in some applications. To achieve such annealing, the annealing temperature should preferably not be below the orientation temperature, and more preferably the annealing temperature is 5-10° C. above the orientation temperature. Most preferably, the annealing temperature is generally not expected to exceed 110-120° C., because as at temperatures exceeding this, the unique aesthetic effects of the film can be harmed. As a last step, the film is cooled through cooling rollers to an ambient temperature. The resulting MD oriented film may be further subjected to either: optional surface treatment steps/optional coatings (described below); or proceed to further TD orientation. In contrast, a shrink film will preferably not have annealing or be at annealing temperature much lower than orientation temperatures.

A typical thickness of the MD oriented film, i.e., overall film, is from 15 microns to 90 microns, preferably from 20 microns to 80 microns, more preferably from 40 microns to 70 microns, alternatively from 20 microns to 50 microns, alternatively combinations thereof. Within these MD oriented films, at least one (or more) of the inventive layers may have a thickness of 20 to 60 microns.

Traverse Direction (TD) Orientation

In an alternative to MD orientation, the unconverted film is subject to TD orientation. One way of conducting TD orientation is using a tenter frame, preferably also using a plurality of tenter clips that orient the film in a non-machine direction, more preferably wherein the non-machine direction is perpendicular to the machine direction. Briefly, the tenter clips clip peripheral edge of the film and pull the film toward the frame of the tenter frame (i.e., the non-machine direction). The stretching temperature range as well as the elongation percentage for the TD orientation process is generally the same as what is desired for MD orientation.

A typical thickness of the TD oriented films is from 15 microns to 90 microns, preferably from 20 microns to 80 microns, more preferably from 40 microns to 70 microns, alternatively from 20 microns to 50 microns, alternatively combinations thereof. Within these TD oriented films, one or more of the inventive layer have a thickness of 20 to 60 microns.

Commercial available converting systems may include those from DUSENBERY, MARSHALL and WILLIAMS, and PARKSINSON. Drive and control systems for film making may include those from ALLEN-BRADLEY Powerflex AC drives, and ALLEN-BRADLEY ControlLogix PLC processor. A suitable manufacture may be PARKINSON TECHNOLOGIES, Inc. (Woonsocket, R.I., USA).

The overall thickness of the at least uniaxially, or biaxially stretched, film of the present invention can vary within broad limits and depends on the intended use. In one example, the overall film thickness is preferably from 15 microns to 90 microns, preferably from 20 microns to 80 microns; in particular from 20 microns to 70 microns, preferably from 30 microns to 60 microns. At least one (or more) of the inventive layers of the film may have a thickness of 20 to 60 microns.

Optional Surface Treatment Steps

The MD films, TD films, or the biaxial oriented (BO) films of the present invention are optionally subjected to one or more surface treatment steps. Surface treatment increases the surface energy of the film to render the film receptive to coatings, printing inks, and/or lamination. Preferred methods include corona discharge, flame treatment, plasma treatment, chemical treatment, or treatment by means of a polarized flame. In a preferred embodiment, one or both of the outermost surfaces of the inventive film is surface treated.

In the case of corona treatment, an advantageous procedure is to pass the film between two conductor elements serving as electrodes, such a high voltage, usually an alternating voltage (from about 5 to 20 kV and from about 5 to 30 kHz), being applied between the electrodes that spray or corona discharges can occur. The spray or corona discharge ionizes the air above the film surface, which reacts with the molecules of the film surface, causing formation of polar inclusions in the essentially non-polar polymer matrix.

For flame treatment with polarized flame, a direct electric voltage is applied between a burner (negative pole) and a chill roll. The level of the applied voltage is between 400 V and 3,000 V, preferably in the range from 500 V to 2,000 V.

Another advantage of present invention is the reduced requirement on surface treatment because of the addition of PMMA in the PP-based film. With the polar PMMA polymers added, the resultant film, either unconverted or after desired orientation process, has a higher surface energy than PP-based films otherwise without PMMA. Thus, a better treated film surface under the same surface treatment process can be achieved, or there can be a reduction or even elimination the surface treatment process while maintaining a surface having a relatively high surface energy.

Measurement of Unique Aesthetic Effects

One way of characterizing the unique aesthetic effects, even the special visual effects of silk or satin, is from the angle dependent light reflection (or "glossiness") and color luminosity (or "L"). A non-flat satin surface provides different angles to certain incident light and thus the reflected light provides different glossiness and L in different areas of the surface. This difference in glossiness and reflection can be measured by the methods described below:

Firstly, Flop Index or "FI" is the characterization of color luminosity change, and can be mathematically calculated by the following formula:

$$\text{Flop Index} = \frac{2.69 \ (L^*_{15°} - L^*_{110°})^{1.11}}{(L^*_{45°})^{0.86}};$$

wherein an incident light that is 45° to the surface, and the mirror reflection direction is symmetrically on the other side of the normal line which is perpendicular to the surface. $L^*_{15°}$ describes the luminosity at the angle which is 15° to the normal line from the reflection direction, and $L^*_{110°}$ is 110° to the normal line from the reflection direction. $L^*_{45°}$ is the normal line which is perpendicular to the surface. Flop Index indicates the L changes with different observation angles and higher FI means more dark and light contrast and thus more evident effect.

FI can be measured following ASTM E2539. Suitable measuring device include multi angle photometer MA98 from X-rite Company.

One aspect of the invention provides for a film having a FI of at least 1, preferably at least 2, more preferably at least 2.1, yet more preferably at least 2.3; according to ASTM E2539.

In addition to unique aesthetic and/or performance properties of the films herein, there can also be tactile benefits. For example, roughness is the character of flat surface profile affecting both visual effects and tactile effects of the subject films. Suitable methods of measuring roughness include ISO 4287:1997. Coefficient of Friction ("COF") is the character of how a film frictions to other contact surfaces under pressure. COF relates to how a film feels, especially the smoothness by touching. A suitable method of measuring COF of a film includes ISO 8295. Hardness is the character of how hard a surface is and it directly affects how a surface feels. A suitable method of measuring film hardness includes ASTM D3363-05. Of course consumer testing (qualitative or quantitative) can also be conducted to characterize these films.

EXAMPLES

Six (6) examples of monolayer films are provided. Examples 1 to 4 are most preferred. Example 5 is outside the scope of the invention. Example 6 is a comparative example.

From a formulation perspective, the monolayer film of Example 1 contains (by weight of the monolayer film): 90% of a PP copolymer Clyrell® RC1890™ (Lyondellbasell), and 10% of PMMA Acryrex® CM211™ (Chimei Corporation, Taiwan). The monolayer film of Example 2 contains (by weight of the monolayer film) the same 90% of PP-based copolymer Clyrell® RC1890™, and 10% of a PMMA Acryrex® CM205™ (Chimei Corporation, Taiwan)). The examples 1 and 2 only differ in PMMA material, and both PMMA materials are from Chimei with their Acryrex® series. CM205™ has a melt flow index of 1.8/10 min, relatively lower than CM211™ which has a melt flow index of 16 g/10 min. Therefore CM211™ is less viscous than CM205™ as melt flow rate is inversely proportional to viscosity. The melt flow index for these PMMA materials is measured at 230° C. and 3.8 Kg according to ASTM D1238.

The monolayer film of Example 3 contains (by weight of the monolayer film): 90% of PP-based component, and 10% of a high viscosity PMMA Acryrex® CM205™; wherein the said PP-based component is comprised of 75% of random PP copolymer Clyrell® RC1890™, and 15% of polypropylene homopolymer T30s™ (commercial grade from Sinopec) by weight of the monolayer film.

The monolayer film of Example 4 contains (by weight of the monolayer film): 88.5% of a random block PP-based copolymer Borclear® B707CF™ (random copolymer PP from Borouge, Abu Dhabi, UAE); 10% of another high viscosity PMMA polymer Altuglas® V020™, (from Arkema, Pa., USA); and 1.5% of a compatibilizer maleic anhydride grafted LLDPE ("LLDPE-g-MA MD715™" from Mitsui Chemical, Tokyo, Japan).

Example 5 is a monolayer film comprising 90% of polypropylene homopolymer T30s™, and 10% of high viscosity PMMA CM205™, by weight of the monolayer film.

Table 1 lists the Vicat softening points, the melt index, and complex viscosity at 0.1 rad/s and 100 rad/s respectively of the PP and PMMA polymers used in the examples. PP homopolymer generally has a higher Vicat softening point than random PP copolymers.

TABLE 1

| Polymer Material | Vicat Softening Point (° C.) | Melt Index | Complex viscosity 220° C. @ 0.1 rad/s | Complex viscosity 220° C. @ 100 rad/s |
| --- | --- | --- | --- | --- |
| PP polymer | | | | |
| PP RC1890 (Random Copolymer) | 110 | 1.7 | 1593.6 | 919.2 |
| PP T30s (Homopolymer) | 155 | 3 | 1455.6 | 875.2 |
| PP RB707CF (Random | 125 | 1.5 | 8468.2 | 891.4 |

TABLE 1-continued

| Polymer Material | Vicat Softening Point (° C.) | Melt Index | Complex viscosity 220° C. @ 0.1 rad/s | Complex viscosity 220° C. @ 100 rad/s |
| --- | --- | --- | --- | --- |
| Block Copolymer) | | | | |
| PMMA Polymer | | | | |
| PMMA CM211 | 102 | 16 | 1277.4 | 181.3 |
| PMMA CM205 | 113 | 1.8 | 21735.2 | 1950.6 |
| PMMA V020 | 103 | 1.6 | 64528.7 | 1553.8 |

The formulations of the films for each example is listed in Table 2A below. Table 2B collects data for complex viscosity ratio and melt index ratio of PMMA/PP in the films, as well as the opacity values of the films in each example. The film making conditions are as follows: the film is a casted film, and is uniaxially oriented in the machine direction in an INTRON tensile tester under 100° C. at a 1700% stretch ratio and 1 m/min stretch rate.

Opacity value is measured, according to ISO 6504, at three different points equidistantly apart from each other on the specimen after tensile orientation together with film thickness of each point. The opacity data is the average of the three data points on each specimen. As the specimen has different thickness after tensile test, to make the opacity more comparable, we normalized the opacity data into a 70 µm thick film via below equation:

Normalized opacity=(averaged opacity/averaged thickness)*70

TABLE 2A

| Formulations | | | | | |
| --- | --- | --- | --- | --- | --- |
| Film Ex. | PP Type | wt % | PMMA Type | wt % | Additives (Compatibilizer) |
| 1 | RC1890 ™ | 90% | CM211 ™ | 10% | 0 |
| 2 | RC1890 ™ | 90% | CM205 ™ | 10% | 0 |
| 3 | RC1890 ™ T30s ™ | 75% 15% | CM205 ™ | 10% | 0 |
| 4 | RB707CF ™ | 89.5% | V020 ™ | 10% | 1.5% |
| 5 | T30s ™ | 90% | CM205 ™ | 10% | 0 |
| 6 | RC1890 ™ | 100% | — | 0% | 0 |

TABLE 2B

| Film Ex. | Melt Index Ratio (PMMA/ PP) | Complex Viscosity Ratio (PMMA/PP) 220° C. | | Opacity Normalized to 70 µm | Process Scale-Up Feasibility* |
| --- | --- | --- | --- | --- | --- |
| | | 0.1 rad/s | 100 rad/s | | |
| 1 | 9.4 | 0.802 | 0.197 | 69.7% | + |
| 2 | 1.06 | 13.64 | 2.12 | 80.4% | + |
| 3 | 1.06 | 13.64 | 2.12 | 82.8% | + |
| | 0.6 | 14.93 | 2.23 | | |
| 4 | 1.07 | 7.62 | 1.74 | 97.5% | + |
| 5 | 0.6 | 14.93 | 2.23 | 90.4% | − |
| 6 | — | — | — | Transparent | + |

*'+' means the film making process can likely be scaled up '−' means there is likely difficulty to scale up (e.g., breakage during orientation)

From a formulation perspective, Examples 1 and 2 differ in PMMA material, and thus the corresponding viscosity of the subject PMMA (as indicated by complex viscosity and melt index). Example 2, containing the more viscous PMMA (CM205™), demonstrates more desired opacity than Example 1 (which contains less viscous PMMA (CM211™)).

From a formulation perspective, Examples 2, 3 and 5 differ in PP material (while having same type of PMMA (CM205™)). Specifically, Example 2 contains random PP copolymer only; Example 3 contains both random PP copolymer and PP homo polymer; while Example 5 contains PP homo polymer only. As indicated above, PP homopolymer generally has higher Vicat softening point than random PP copolymer. Therefore, the results show that the higher the Vicat softening point of PP is, the more desired aesthetic effect (opacity) is achieved. However, although the monolayer film of Example 5 exhibits good aesthetic effects (e.g., high opacity), breakage is prone to occur during MD orientation in the processing of the film of Example 5. Therefore, Example 1 to 4 are within the scope of the present invention, however, Example 5 falls outside of the scope of the present invention as failing to provide desired manufacturing scale up properties.

Example 6 is a comparative example of monolayer film comprising 100% of PP RC1890™ copolymer with no PMMA. The film making conditions are as follows: the film is a casted film, and is uniaxially oriented in the machine direction in an INTRON tensile tester under 90° C. at a 1700% stretch ratio and 1 m/min stretch rate. The comparison of Flop Index (H) data for the Examples 1 to 3 and Example 6 under the same film making conditions is provided in Table 3.

TABLE 3

| Example | Flop Index (FI) |
| --- | --- |
| Example 1 | 4.3 |
| Example 2 | 2.1 |
| Example 3 | 5.2 |
| Example 6 (100% PP) | 0.5 |

The inventive films of Examples 1 to 3 have better results of FI than the conventional pure PP film.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A film comprising at least one layer, wherein the at least one layer comprises:
   60% to 99%, by weight of the at least one layer, of polypropylene (PP)-based component;
   1% to 40%, by weight of the at least one layer, of poly(methyl 2-methylpropenoate) (PMMA)-based component; and
   0% to 30%, by weight of the at least one layer, of an optional additive;
   wherein the PP-based component comprises at least a first polypropylene polymer,
   wherein the first polypropylene polymer has a Vicat softening point of 100° C. and above under 1 kg and rate A according to ASTM D1525, and
   wherein the PMMA-based component and the PP-based component have a complex viscosity ratio PMMA/PP; wherein the complex viscosity is measured via a rotational rheometer with oscillation frequency sweep from 100 to 0.1 rad/s within 20 minutes, under condition of isothermal oscillation at a 220° C. temperature with 1% constant strain according to ASTM D4440-15, and wherein the complex viscosity ratio PMMA/PP is 20 or less than 20 for the oscillation frequencies of 100 and 0.1 rad/s.

2. A film according to claim 1, wherein the first polypropylene polymer has a Vicat softening point from 100° C. to 150° C.; under 1 kg and rate A according to ASTM D1525.

3. The film according to claim 1, wherein the PP-based component comprises from 10% to 100%, by weight of the PP-based component, of the first polypropylene polymer.

4. The film according to claim 1, wherein the PMMA-based component comprises a PMMA polymer having a Vicat softening point no less than 95° C.; under 1 kg and rate A according to ASTM D1525.

5. The film according to claim 1, wherein the first polypropylene polymer in the PP-based component is selected from the group consisting of random propylene-olefin copolymer, block propylene-olefin copolymer, and combinations thereof.

6. The film according to claim 1, wherein the PP-based component further comprises a second polypropylene polymer, wherein the second polypropylene polymer has a Vicat softening point above 150° C.

7. The film according to claim 6, wherein the PP-based component comprises from 1% to 90%, by weight of the PP-based component, of the second polypropylene polymer.

8. The film according to claim 6, wherein the second polypropylene polymer in the PP-based component is selected from the group consisting of polypropylene homopolymer, random propylene-olefin copolymer, block propylene-olefin copolymer, and combinations thereof.

9. The film according to claim 1, wherein the at least one layer comprises, based on the weight of the at least one layer, (a) 65% to 98%, of the PP-based component; (b) 2% to 35%, of the PMMA-based component; and (c) 1% to 30%, of the optional additive; wherein the optional additive is selected from the group consisting of a silicone additive, a compatibilizer, and combinations thereof.

10. The film according to claim 1, wherein the film has an opacity of greater than 50%, when measured at 70 microns thickness per ISO 6504.

11. The film according to claim 1, wherein the PMMA-based component and the PP-based component have a melt index ratio PMMA/PP of 0.1 or above; and wherein the melt index is measured at 190° C. and 2.16 Kg for PP and at 230° C. and 3.8 Kg for PMMA according to ASTM D1238.

12. The film according to claim 1, wherein the film having a Flop Index (FI) of at least 1; according to ASTM E2539.

13. The film according to claim 1, wherein the at least one layer contains from 0% to less than 5%, by weight of the at least one layer of the film, of an opacifier; wherein the opacifier is at least titanium dioxide.

14. A film comprising at least one layer, wherein the at least one layer comprises:
- 60% to 99%, by weight of the at least one layer, of polypropylene (PP)-based component;
- 1% to 40%, by weight of the at least one layer, of poly(methyl 2-methylpropenoate) (PMMA)-based component; and
- 0% to 30%, by weight of the at least one layer, of an optional additive;
- wherein the PP-based component comprises at least a first polypropylene polymer,
- wherein the first polypropylene polymer has a Vicat softening point of 100° C. and above under 1 kg and rate A according to ASTM D1525, and
- wherein the PMMA-based component and the PP-based component have a complex viscosity ratio PMMA/PP; wherein the complex viscosity is measured via a rotational rheometer with oscillation frequency sweep from 100 to 0.1 rad/s within 20 minutes, under condition of isothermal oscillation at a 220° C. temperature with 1% constant strain according to ASTM D4440-15, and wherein the complex viscosity ratio PMMA/PP is 20 or less than 20 for oscillation frequency of 100 and/or 0.1 rad/s.

* * * * *